United States Patent Office 2,776,536
Patented Jan. 8, 1957

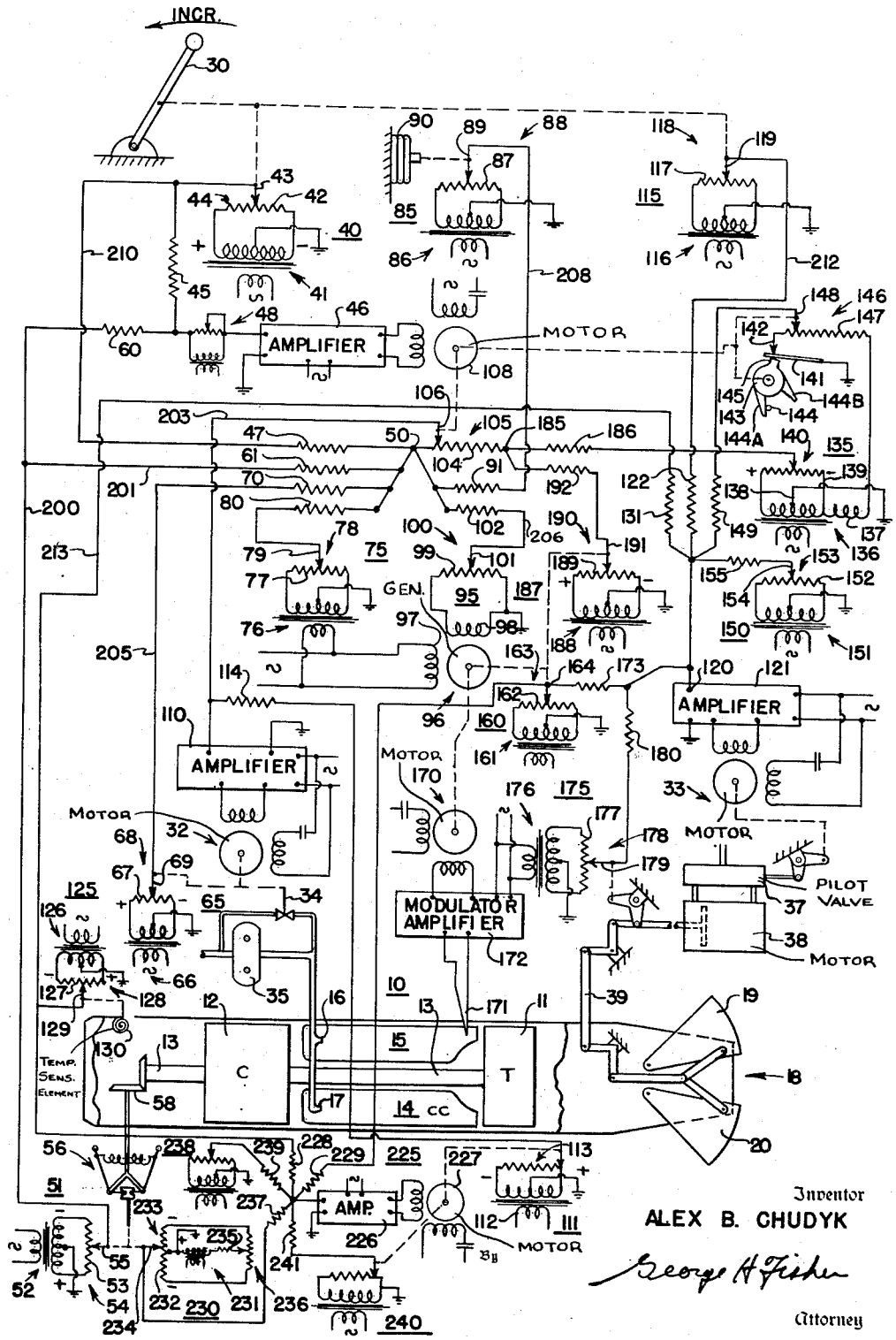

2,776,536

COMBUSTION ENGINE CONTROL APPARATUS

Alex B. Chudyk, St. Louis Park, Minn., assignor to Minneapolis-Honeywell Regulator Company, Minneapolis, Minn., a corporation of Delaware Application August 19, 1950, Serial No. 180,335

26 Claims. (Cl. 60—35.6)

The present invention is concerned with a new and improved control apparatus for a combustion engine. More particularly, the invention is concerned with a control apparatus for a combustion engine of the jet or gas turbine type wherein fuel flow control means are provided and means for controlling the flow of the exhaust gases from the engine are provided.

In controlling gas turbines, particularly those where the driving energy is obtained from the thrust of the gases leaving the exhaust of the engine, there is a problem of being able to accelerate from a low power level to a high power level in a minimum of time. In a copending application of Benjamin H. Ciscel et al., Serial No. 157,304, filed April 4, 1950, there is shown one method of controlling a gas turbine where fuel flow to the combustion chamber of the turbine is normally under control of an apparatus responsive to the speed of the turbine. In the Ciscel et al. application whenever a condition requiring acceleration has been created in the engine the speed control portion of the control apparatus is no longer effective to control fuel flow and an engine temperature responsive control is substituted for the speed control and this temperature control stays in control of the flow of fuel to the engine until the need for acceleration no longer exists. The present application is an improvement of the arrangement shown in the Ciscel et al. application and is applied to a gas turbine of the type where there is a fuel flow controller and a controller for regulating the flow of the exhaust gases leaving the engine. In the control apparatus of the present application, under normal operating conditions, the fuel flow is controlled by engine speed while the exhaust flow controller is normally controlled by an engine temperature. In control apparatus of the present type, under accelerating conditions, it has been found that the acceleration time may be reduced considerably by shifting the exhaust air flow controller to a fixed position and regulating the fuel flow in accordance with engine temperature until such time as acceleration is no longer needed. It has also been found that the stability of the control apparatus and operation of the engine can be materially improved by making the changeover from speed control of fuel flow to temperature control of fuel flow in a gradual or modulating manner. The shifting of the exhaust air flow controller from speed control back to temperature control is also best done by making the change in a gradual manner. A control arrangement such as the present one will prevent sudden operational surges in the functioning of the engine which tend to occur during changeovers upon accelerating.

Another item that must be guarded against is surging in the compressor. The surging, when occurring, amounts to an effective reversal of air flow within the compressor and will result in a loss of compression. While surging is most apt to occur during acceleration of the engine, it can occur under normal operating conditions. As any surging is undesirable, the present control apparatus provides for cutting down fuel flow to the engine when the conditions which bring about surge indicate that a surge is about to occur.

It is therefore an object of the present invention to provide a control apparatus for a combustion engine having a fuel controlling means and exhaust flow control means where the fuel flow control means is normally under control of engine speed and the exhaust flow control means is normally under control of engine temperature and upon the occurrence of a predetermined condition, the engine temperature becomes effective to control the fuel flow and the exhaust flow control means is moved to a predetermined position.

Another object of the present invention is to provide a control apparatus for gradually shifting the control of fuel flow to a combustion engine from engine speed control to engine temperature control during acceleration conditions.

Still another object of the present invention is to provide for the shifting of an exhaust gas flow control means of a combustion engine to a fixed position upon the occurrence of conditions requiring acceleration.

Another object of the present invention is to provide a control apparatus for quickly shifting a temperature controlled exhaust gas flow controller of a combustion engine to a predetermined position upon the occurrence of an acceleration condition and gradually shifting the control back to control by temperature when the acceleration condition decreases.

A further object of the present invention is to provide a control apparatus which controls the fuel flow to a combustion engine in accordance with the rate of change of engine temperature and upon occurrence of acceleration conditions controls the fuel flow in accordance with the direct value of engine temperature.

A still further object of the present invention is to provide a control apparatus for controlling the fuel flow to a combustion engine in accordance with atmospheric pressure and shifting the control from atmospheric pressure to engine temperature upon the occurrence of a predetermined condition.

Still another object of the present invention is to provide a controller for an engine having a compressor which will sense conditions indicating a danger of compressor surge and will control the fuel flow to revent that surge.

A still further object of the present invention is to provide a control apparatus having first and second control motors, the first normally under control of a first condition and the second normally under control of a second condition with the second condition being shifted to control the first motor and the second motor assuming a fixed position upon the occurrence of a third condition.

A still further object of the present invention is to provide a control apparatus having first and second control motors, the first normally under control of a signal proportional to the magnitude of a condition and the second normally under the control of a signal indicative of the rate of change of the condition with means for shifting the signal indicative of the magnitude of the condition to control the second control motor and with means for causing the first controlled motor to assume a predetermined position upon the occurrence of a second condition.

These and other objects of the present invention will be understood upon considering the following specification and the appended drawing.

Referring to the single figure, the numeral 10 represents a combustion engine of the gas turbine type. The engine comprises a turbine 11 which drives a compressor 12 through an interconnecting shaft 13. The turbine 11 is driven by the gases from combustion chambers 14 and 15 expanding through the turbine and causing the same to rotate. A pair of fuel nozzles 16 and 17 are provided to supply fuel to the combustion chambers and the fuel from these nozzles is mixed with the air compressed by the compressor 12 to form a combustible mixture, which is burned in the chambers 14 and 15. After the combustion products have passed through the turbine 11 the gases pass out the rear of the engine through an opening indicated generally by the numeral 18. Controlling the flow of the exhaust gases out the rear of the engine are a pair of shutter-like members or eyelids 19 and 20 which are adjustable to vary the outlet area of the engine.

For controlling the engine 10, an automatic control apparatus has been provided which, broadly, includes a power selecting lever 30 which is operable to reversibly control, through electrical circuits controlling a pair of motors 32 and 33, the flow of fuel to the nozzles 16 and 17 and the position of the eyelids 19 and 20. The motor 32 is arranged to control a by-pass valve 34 which by-passes fuel around a fuel pump 35, the latter supplying fuel to the nozzles 16 and 17. The motor 33 is arranged to adjust a pilot valve 37 of a hydraulic servomotor 38, the latter of which operates through a suitable linkage and toggle arrangement 39 to position the eyelids 19 and 20. While motors 32 and 33 are shown directly connected to valve 34 and pilot valve 37, respectively, suitable gear train and linkages are actually used for these connections and throughout this disclosure it is intended that the motors are connected to the driven means through such gear train and linkages. While motors such as 32 and 33 are preferred as actuators, any other suitable servo means may be so used.

The electrical networks which are used in the present control apparatus comprise a number of individual voltage signal sources whose output voltages are interconnected for summation by parallel addition. Each of the individual voltage signal sources is adjusted by some particular function which affects the engine operation. The electrical signal from each particular group, when added by parallel addition, are fed to control amplifiers which are preferably of the discriminator sort such as disclosed in the Upton Patent 2,423,534 issued July 8, 1947. The outputs of these amplifiers are used to reversibly control two phase reversible motors which may also be of the type disclosed in the Upton patent. The direction of rotation of these motors will be determined by the electrical phasing of the alternating current signal which is applied to the input of the amplifier associated with the motor.

Referring specifically to the control circuits which normally effect the operation of the motor 32, these control circuits will be seen to comprise a manually adjusted network 40 including a transformer 41 having a center tapped secondary winding with the end terminals thereof connected to the end terminals of a resistor 42 of a potentiometer 44, the potentiometer having a slider 43. The slider 43 is arranged to be moved by the power lever 30. The electrical signal arising from the network 40 is fed through a summing resistor 45 and biasing source 48 to the input of an amplifier 46. The signal arising from network 40 is also fed through a further summing resistor 47 to a summing terminal indicated by the numeral 50. A further signal source for the motor 32 is a network 51 which comprises a transformer 52 having a center tapped secondary winding which is connected to a potentiometer resistor 53 of potentiometer 54, which potentiometer has a slider 55. The slider 55 is arranged to be positioned by a suitable speed indicating device which has been indicated generally by the numeral 56. This speed indicating device is arranged to be driven by suitable gearing 58 which connects the indicator 56 to the shaft 13 of the engine 10. The output from the network 51 is fed through a summing resistor 60 into the input of amplifier 46 and is also fed through a further summing resistor 61 to the summing terminal 50.

A further signal source which affects the operation of motor 32 is a follow-up network 65 which comprises a source of power 66 having a tapped secondary winding whose output terminals are connected to a potentiometer resistor 67 of a potentiometer 68, the latter having a slider 69. The slider 69 is adjusted by the motor 32 as the motor adjusts the by-pass valve 34. The output from this network 65 is fed through a summing resistor 70 to the summing terminal 50. Also controlling the operation of the motor 32 is a calibration network 75 which has power supplied thereto by a suitable transformer 76 with a tapped secondary winding whose end terminals connect to a potentiometer resistor 77 of a potentiometer 78 having a slider 79 which may be manually adjusted. The output of the calibration network 75 is fed through a suitable summing resistor 80 to the summing terminal 50.

Another signal source which affects the operation of the motor 32 is the altitude responsive network 85 which has power supplied thereto by a suitable transformer 86 with a center-tapped secondary winding. The ends of the secondary winding are connected to a potentiometer resistor 87 of a potentiometer 88. A slider 89 of the potentiometer is arranged to be variably positioned by an altitude or atmospheric pressure responsive bellows 90. The output of this altitude responsive network 85 is fed through a suitably summing resistor 91 to the summing terminal 50.

A further signal source affecting the operation of the motor 32 is the engine temperature rate of change responsive network 95. The electrical signal derived from this network comes from the output winding of a velocity generator 96 which has a suitable energizing winding 97 and an output winding 98. The output winding 98 is connected across the end terminals of a potentiometer resistor 99 of a potentiometer 100. A slider 101 is provided for variably selecting the amount of output from the network 95. The output from this network 95 is fed through a suitable summing resistor 102 to the summing terminal 50.

The summing terminal 50 actually is connected to the left end of a potentiometer resistor 104 of a transfer potentiometer 105. A slider 106 of the transfer potentiometer 105 is variably positioned by a reversible two-phase motor 108, the latter which is driven by a power signal arising from the amplifier 46. The amplifier 46 and the motor 108 may be of the type disclosed in the above mentioned Upton patent. The slider 106, normally biased to the left end of the resistor 104 is directly connected to the input of amplifier 110. The amplifier 110 is used to reversibly drive motor 32 in accordance with the input signals fed to the amplifier from the slider 106.

Connected directly to the input of amplifier 110 is a surge signal network 11 which comprises a transformer 112 connected to the ends of a potentiometer 113. The signal on the wiper of the potentiometer is fed through a summing resistor 114 to the input of amplifier 110. The controller for adjusting the potentiometer slider will be explained below.

The control signals for controlling the motor 33 also arise from a plurality of signal sources. A first of the signal sources is the temperature selecting network 115 which has power supplied thereto by a transformer 116 having a center tapped secondary and with the end terminals of the secondary connected to the potentiometer resistor 117. The resistor 117 is a part of potentiometer 118 having a slider 119 which is arranged to be adjusted by the power selecting lever 30. The output signal from the temperature selecting network 115 is fed to the input terminal 120 of amplifier 121 through a summing resistor 122. A further signal source is the temperature network 125; this network comprises a transformer 126 having a center tap secondary with the end terminals of the secondary connected to a potentiometer resistor 127 of potentiometer 128. A slider 129 of the potentiometer 128 is arranged to be positioned by a suitable temperature indicating element which is indicated generally by a bimetal 130. This bimetal is arranged to respond to the intake temperature of the engine 10 and this is the combined effect of ram temperature and ambient temperature. The output from the temperature network is fed through a summing resistor 131 to the input terminal 120 of amplifier 121.

A further signal source for the motor 33 is derived from a transient calibration network 135 which comprises a transformer 136 with a secondary winding 137 with taps at 138 and 139. The tap 138 is connected to ground and the tap 139 is connected to one end of a calibration potentiometer 140. The other end of the calibration potentiometer is connected to the left end of the secondary 137. Connected to the right end of secondary 137 is a cam operated switch mechanism comprising a cam 143, having stop arms 144A and B and a rise portion 145, which is arranged to be operated when the motor 108 is driven from a predetermined position, a switch blade 141 and a switch contact 142. During normal operation, the cam 143, by means of the rise portion 145 maintains the switch blade 141 in engagement with contact 142. A potentiometer 146 having a resistor 147 and a slider 148 is arranged with one end of the resistor connected to the right end of winding 137 and the other end connected to the contact 142. When the switch blade 141 engages contact 142, the left end of resistor 146 is connected to ground. The slider 148 is connected to the input terminal 120 of amplifier 121 through a suitable summing resistor 149.

Another signal source which normally affects motor 33 is the calibration network 150. This network comprises a transformer 151 having a center tapped secondary winding with the end terminals of the winding connected to a suitable resistor 152 of a potentiometer 153 which also has a slider 154. The output from the calibration network 150 is fed through a suitable summing resistor 155 to the input terminal 120 of amplifier 121. A further signal source for motor 33 is the temperature indicating network 160. This network comprises the transformer 161 having a center-tap secondary winding connected to a potentiometer resistor 162 of a potentiometer 163. A slider 164 is arranged to be positioned by a motor 170 which is positioned in accordance with the temperature indicated by a thermocouple 171 exposed to the inlet temperature to turbine 11. The signal from the thermocouple 171 is fed through a suitable modulator and amplifier 172 which is operative to position the motor 170 in accordance with the temperature indicated by the thermocouple 171. This modulator amplifier combination may be of the type disclosed in the Jones Patent 2,306,479, issued December 29, 1942. The output signal from the temperature indicating network 160 is fed through a suitable summing resistor 173 to the input terminal 120 of amplifier 121.

A further signal source for motor 33 is a rebalance network 175 which comprises a transformer 176 having a center tapped secondary winding which is connected to the end terminals of resistor 177 of a potentiometer 178. A slider 179 is arranged to be positioned by the operation of the servomotor 38 as it positions the eyelids 19 and 20. The output from the rebalance network is fed through a summing resistor 180 to the input terminal 120 of the amplifier 121.

On the right hand terminal of the potentiometer resistor 104 of transfer potentiometer 105 is a summing terminal 185. This summing terminal has a control signal fed thereto from the transient calibration network 135 through a summing resistor 186. A further signal for the summing terminal 185 is derived from the transient temperature indicating network 187 which comprises a transformer 188 having a tapped secondary winding with the end terminals thereof connected to resistor 189 of a potentiometer 190. A slider 191 is arranged to be positioned by the operation of the temperature indicating motor 170. The output from the network 187 is fed through a suitable summing resistor 192 to the summing point 185.

A surge preventing controller 225 comprises an amplifier 226 which controls a motor 227. The motor 227 is arranged to position the slider of potentiometer 113. The input signals for the amplifier 226 are derived from the intake or ram temperature responsive network 125, with the control signal therefrom being fed to the amplifier through summing resistor 228, and engine temperature indicating network 160, with the control signal being fed through summing resistor 229 to the amplifier. A further signal source is the engine speed indicating network 230, this network comprising a transformer 231 having a secondary winding with its left end connected to a center tap on a resistor 232 of a potentiometer 233, the latter of which has a slider 234 arranged to be adjusted by the speed responsive device 56. A current limiting resistor 235 is connected between the right end of the secondary and the slider of a speed calibration potentiometer 236. The output from network 230 is fed from slider 234 through a summing resistor 237. Still another signal is derived from the calibration network 238 which has its output coupled into amplifier 226 by a summing resistor 239. Also feeding a signal to the amplifier is a rebalance network 240 whose output is fed through a summing resistor 241.

While separate sources of power have been shown for each of the networks, it is to be understood that the network may be supplied by a common source as in conventional practice.

*Operation*

Considering the operation of the present control apparatus, it will first be assumed that the operation is during a steady state or normal operation of the engine. For purposes of the present apparatus, steady state or normal operation is assumed to be that condition of operation when the selected engine speed, selected by the power lever 30 positioning the slider 43, is substantially matched by the speed of the engine, as indicated by the position of the slider 55 in the speed indicating network 51, the slider being positioned by the speed responsive device 56. The operation will also be considered with respect to the control channel which controls the position of the by-pass valve 34.

Assume first that the slider 43 of the speed selecting network 40 is centered on the potentiometer resistor 42 so that the electrical signal between the slider 43 and the grounded center tap of the secondary of transformer 41 is zero. Assume also that the speed indicating device 56 has the slider 55 centered on the resistor 53 so there will be no electrical signal appearing between the slider 55 and the grounded center tap of the secondary of transformer 52. Further, assume that the rebalance slider 69 is centered on the resistor 67 so that the electrical signal when measured between the slider 69 and the grounded center tap of transformer secondary 66 will also be zero. Assume also that the calibration slider 79 is centered on the potentiometer resistor 77 so that there is no electrical signal appearing between the slider 79 and the grounded center tap of the secondary of transformer 76. In the altitude responsive network 85, assume that slider 89 is also centered on the potentiometer resistor 87 so that there is no electrical signal appearing between the slider 89 and the grounded center tap of the secondary of transformer 86. Assume also that the velocity generator 96 is stationary so that there is no signal arising in the network 95. Under this set of assumed conditions with no electrical signals arising at any of the networks, there will be no signals applied to the input of the amplifier 110 and the motor 32 will therefore not be energized.

It should also be assumed that the slider of surge indicating potentiometer 113 is at its right hand end and is effectively grounded so that there will be no signal appearing on the slider and none on the input to amplifier 110.

As long as the sliders of each of the respective potentiometers in the individual control networks stay in the position in which they have been assumed, the motor 32 will remain stationary.

Assume now that the speed of the engine should begin to gradually decrease. This decrease in speed will be indicated by the speed indicator 56 moving the slider 55 in a downward direction over the potentiometer resistor 53. When the slider 55 moves in a downward direction over resistor 53, assuming the phasing for one particular half cycle of the alternating current supply to be such that the upper terminal of the resistor 53 is negative and the lower terminal thereof is positive, an electrical signal will appear between the slider 55 and ground and this signal will be slightly positive with respect to ground. The electrical signal arising from the speed indicating network 51 on the slider 55 will be fed through the conductor 200, conductor 201, summing resistor 61, summing terminal 50, slider 106, and conductor 203 to the input of amplifier 110. The phasing of the signal on the input of amplifier 110 will be positive with respect to ground and will be such as to cause the motor 32 to rotate in a direction to increase the amount of fuel flowing to the nozzles 16 and 17 of the combustion chambers 14 and 15. This increase of fuel flow will result from the closing down of the by-pass valve 34. As the by-pass valve 34 is being adjusted, the slider 69 of the rebalance network 65 is also adjusted. The slider 69, when the fuel flow is being increased, will be moved toward the right. Assuming the alternating current phasing for the particular half cycle under consideration to be such that the right hand terminal of resistor 67 is negative and the left hand terminal is positive, the movement of the slider 69 toward the right will result in a slightly negative voltage appearing upon the slider 69 with respect to ground. This slightly negative voltage will be fed through the conductor 205, summing resistor 70, summing terminal 50, slider 106, and conductor 203 to the input of amplifier 110 to effectively balance out the positive signal which arose from the speed indicating network 51.

With the follow-up signal of network 65 cancelling the signal from the speed indicating network 51 the amplifier 110 will no longer be effective to position the motor 32 and the motor will stop. As the fuel flow has been increased by the motor 32 when it was operating there will be an increase in the rate of combustion occurring within the chambers 14 and 15 and a resulting increase in the speed of the turbine 11. This increase in speed will cause the speed indicating device to start moving back toward ts originally assumed position. As it begins to move back the slider 55 will have a voltage thereon which is still positive but decreasing in magnitude. With this signal decreasing in magnitude and with the follow-up slider 69 in its adjusted position the negative voltage arising on the slider 69 will be larger than that of the positive voltage arising from the slider 55 and therefore a negatively phased voltage will be applied to the input of the amplifier 110 and the motor 32 will be operative in the opposite direction to open up the by-pass valve 34 and to reposition the slider 69 so that the electrical signal on the slider will tend to match that upon the speed indicating slider 55. Neglecting any droop in this system, the engine speed will go back to that value which was originally assumed and the slider 55 will be centered on the resistor 53 and the rebalance slider 69 will be centered on the potentiometer resistor 67. The apparatus will stay in this position until such time as there is again a deviation due to a change in engine speed.

Considering now the effect of the velocity generator 96 upon the operation of the motor 32 under steady state of normal operating conditions, it will be noted that this velocity generator is driven by the temperature indicating motor 170 whenever the motor is changing the position of the temperature indicating sliders. When the motor of the generator is rotating, a voltage will be induced into the output winding 98 and the phase of this voltage will be dependent upon the direction of rotation of the rotor of the generator and the magnitude of the voltage will be dependent upon the speed at which the generator is being driven. As the functioning of the velocity generator in this particular apparatus is to stabilize the operation of the fuel control motor 32 the phasing of the output of the winding 98 is selected so that it will correspond to the phasing of the signal arising from the rebalancing network 65. In considering the above assumed situation where the fuel flow is momentarily increased to bring the engine speed back to the desired value, when such occurred, the effect of the velocity generator will be to add a rebalancing signal. This rebalancing signal will result from the fact that the increased fuel flow into the chambers 14 and 15 will mean an increase in temperature of the gases expanding out of the chambers and this temperature will be indicated by the thermocouple 171. Thermocouple 171, acting through the amplifier 172, will effect repositioning of the motor 170 and the velocity generator 96 will be driven while that motor is being repositioned. As it is being driven the output voltage on the network 95 will be such that the slider 101 will have a slightly negative voltage when measured between the terminal and ground. This slightly negative voltage is fed through the conductor 206, summing resistor 102 and summing terminal 50, slider 106, conductor 203 to the input of amplifier 110. This slightly negative voltage will combine with the negative voltage from the rebalance network 65 and will be effective to counterbalance the positive voltage arising from the speed indicator network 51. This will mean that the fuel by-pass valve 34 will not be operated to such a great extent as would be the case if the temperature rate of change signal were not introduced. Obviously, this will have the effect of maintaining the operation stable by preventing overshooting of engine speed as well as engine temperature, as will be understood when the temperature channel is considered.

The functioning of the altitude responsive bellows 90 is to control the fuel flow in accordance with changes in altitude. As the engine designer can control the design of the engine to determine whether or not fuel flow should be increased or decreased with changes in altitude, the phasing of the transformer 86 on the altitude responsive network 85 will be dependent upon the type of engine on which the control apparatus is used. Obviously, when there is a change of altitude, the bellows 90 will be effective to move the slider 89 over the potentiometer resistor 87 and there will be a resultant electrical signal appearing upon the slider 89 which will be fed through conductor 208, summing resistor 91, summing terminal 50, slider 106, conductor 203 to the input of amplifier 110 where the signal is combined with the other signals appearing from the other electrical networks and will be effective to cause the motor 32 to be positioned in accordance with the changes in altitudes sensed by the bellows 90.

Small movements of the power lever 30 and the resultant adjustment of the slider 43 on resistor 42 will be effective to directly control the operation of the motor 32. For large sudden changes of the position of this power lever 30, a further mode of operation takes place and this mode will be discussed below. Assume for the present that a slight movement is made of the slider 43 by the power lever 30 and assume that this is in a power increasing direction so that the slider 43 will move toward the left. As the slider moves toward the left from the above assumed central position the voltage appearing upon the slider 43 when measured with respect to the grounded center tap of the secondary of transformer 41 will be slightly positive and this positive voltage will be fed through conductor 210, resistor 47, summing terminal 50, slider 106, and conductor 203 to the input of amplifier 110. This positive voltage will be effective to cause the motor 32 to drive the bypass valve toward closed position the same as occurred when the speed indicating network 51 applied a positive voltage to the input of amplifier 110. With the closing of the fuel bypass valve 34 there will be an increase in the fuel flow to the nozzle 16 and 17 and an increase in the speed of the turbine 11. This increase will be indicated by the changing of the output signal from the speed indicating network 51. The output signal from this speed indicating network when combined with the electrical signal arising from the followup network 65, associated with the bypass valve 34, will result in the cancelling out of the control signal arising from the speed selecting network 40. Thus, the fuel bypass valve will be adjusted to a new position at which the flow of fuel to the combustion chamber will be at an increased rate and there will be an increase in the speed of the turbine which will be maintained as long as the power lever 30 is in its newly adjusted position.

Next to be considered is the control channel which, during steady state or normal operation, controls the positioning of the eyelids 19 and 20 over the outlet 18 of the engine 10. In considering the temperature control channel, assume first that the slider 119 of the temperature selecting network 115 is centrally positioned on the potentiometer resistor 117 so that there is no electrical signal between the slider 119 and the grounded center tap of the secondary of transformer 116. This will mean that there will be no electrical signal arising from the network 115 on slider 119 to be fed through the conductor 212 and summing resistor 122 into the input terminal 120 of amplifier 121. Assume further, that the slider 129 of the ram temperature network 125 is centrally positioned on the resistor 127 so that there is no electrical signal between the slider 129 and the grounded center tap of the secondary of transformer 126. This will means that there will be no electrical signal applied to the input of amplifier 121 through conductor 213, resistor 131 and input terminal 120.

Assume also that the slider 164 is centrally positioned on the resistor 162 in the temperature indicating network 160 so that there will be no electrical signal between the slider 164 and the grounded center tap of secondary of the transformer 161. This will mean there will be no electrical signals from the temperature indicating network 160 fed through the summing resistor 173 to the input terminal 120 and amplifier 121. In considering the rebalance network 175 also assume here that the slider 179 is centrally positioned on the resistor 177 so that there is no electrical signal between the slider 179 and the grounded center tap of the secondary of transformer 176. This will mean that with respect to network 175 there will be no electrical signal fed therefrom through the summing resistor 180 to the input terminal 120 of the amplifier 121. With the above assumed set of conditions with respect to the temperature control channel, it will be obvious that there will be no electrical signal on the input of the amplifier 121 and the motor 33 will remain in a fixed position. As long as the motor remains in a fixed position there will be no movement of the hydraulic pilot valve 37 or the servomotor 38 so that the eyelids 19 and 20 will remain in a fixed position.

Assume now that there has been a temperature drop on the outlet of the combustion chambers 14 and 15 so that the temperature of the thermocouple 171 will have dropped. With the temperature of the thermocouple dropping the modulator and amplifier 172 will be effective to cause rotation of the motor 170 and this motor 170 will drive the slider 164 of the temperature indicating potentiometer 163 toward the right. For purposes of illustration, assume that the phasing of the transformer 161 in the temperature indicating network 160 is such that the left hand terminal of the potentiometer resistor 162 is negative and the right hand terminal of this resistor is positive. Thus, as the slider 164 is moved toward the right from a center position, there will be a positive voltage appearing upon the slider 164 when measured between that slider and the ground terminal which is connected to the center tap of the second of transformer 161. This positive voltage will be fed through the summing resistor 173 to the input terminal 120 of amplifier 121 and the amplifier will be effective to cause rotation of the motor 33. The rotation of the motor 33 will be in a direction to cause the pilot valve to move the servomotor 38 toward the right so that the linkage 39 will cause the eyelids 19 and 20 to move in a closed direction. As the linkage between the servo 38 and the eyelids 19 and 20 is moved, the slider of the followup network 175 will also be moved in a downward direction. Assume that, with the particular half-cycle of the alternating current power supply under consideration, the phasing of the transformer 176 is such that the upper terminal of the potentiometer resistor 177 will be positive and the lower terminal will be negative. As this slider moves in a downward direction there will be a voltage appearing on this slider which will be slightly negative when measured with respect to the grounded center tap of the secondary of transformer 176.

This negative voltage will be fed through the summing resistor 180 to the input terminal 120 on the amplifier 121 and will tend to cancel out the signal arising from the temperature indicating network 160. When this signal does cancel out the signal from the temperature indicating network there will be no further signal on the amplifier 121 tending to cause rotation of the motor 33 so that the apparatus will stop positioning the eyelids 19 and 20. As soon as the eyelids 19 and 20 have moved there will be a resultant change in the flow of gases from the outlet 18 of the engine and a pressure will be built up on the upstream side of the eyelids 19 and 20. As this pressure builds up there will be a decrease in the pressure drop across the turbine 11 and a resultant increase in the temperature of the thermocouple 171. As the thermocouple 171 begins to pick up in temperature it will cause the modulator and amplifier 172 to drive the motor 170 in a direction so that the slider 164 will be moved back toward the position from which it was originally moved. This will eliminate the positive signal arising from the temperature indicating network 160 so that the signal going into the amplifier 121 will be solely from the rebalance network 175 and this will be a negative signal which will tend to cause the amplifier to drive motor 33 in the opposite direction. When the motor 33 is driven in the opposite direction the pilot valve 37 and the servomotor will be moved in the opposite direction so that the eyelids 19 and 20 will be moved back to approximately the same position they were originally with the slider 179 moving back to its originally assumed position where there is balance in the system.

If adjustment should be made of the power lever 30 there will be a resultant movement of the slider 119. The movement of the power lever 30 and the slider 119 may be coordinated by a suitable scheduling arrangement (not shown) so that the relation between the movement of the power lever and the slider will not necessarily have to be linear. This scheduling may be accomplished by any suitable interconnecting arrangement such as shown and indicated by number 42 in Letters Patent of Alex B. Chudyk et al. No. 2,652,896, issued September 22, 1953, or an equivalent, and must of necessity be matched to the particular engine to which the control apparatus is used. Assuming that movement of the power lever 30 in the power increasing direction or toward the left will result in the slider 119 being moved toward the left upon the potentiometer resistor 117, there will be a resultant signal appearing upon the slider 119 which will be positive with respect to the grounded center tap of the secondary transformer 116. This positive signal will be fed through the conductor 212, the summing resistor 122 to terminal 120 of amplifier 121 and will be effective to cause rotation of the motor 33. The motor 33 will in turn cause movement of the pilot valve 37 and the servomotor 38 will move to close down the eyelids 19 and 20.

As the eyelids tend to close the linkage mechanism 39 will be effective to move the slider 179 of the rebalance network 175 in a downward direction so that again a negative voltage will appear upon the slider 179 and this negative voltage when summed with the positive voltage arising from the temperature selecting network 115 will slow down the operation of the motor. As the eyelids 19 and 20 move to a more closed position the temperature of the engine will increase and the temperature of the thermocouple will also increase. This will mean that the modulator amplifier 172 will be effective to cause the temperature indicating motor 170 to move in a direction to cause the slider 164 to be positioned toward the left upon the potentiometer resistor 162. This will mean a more negative voltage will be appearing on the temperature indicating network 160, which, when combined with a negative voltage arising from the rebalance network 175, will be effective to stop operation of the motor 33 and the apparatus will stabilize out with a new engine temperature and a new exhaust outlet area.

It is to be understood that the gas flow control accomplished by the eyelids 20 and 19 can be taken care of by any other suitable gas flow control means capable of controlling the flow of air and other gases through the engine and thereby affecting engine temperature.

Inasmuch as the engine temperature is dependent to a certain extent upon the condition of air going into the engine and the speed at which this air is going into the engine it is necessary to take into account the temperature of the air as it is rammed into the front of the engine 10. The total intake temperature indication is obtained from any suitable temperature indicating mechanism which has been indicated by the numeral 130. This mechanism is effective to position the slider 129 over the potentiometer resistor 127 in accordance with the changes in the intake temperature. Assuming the phasing of the transformer 126 is such that the phase upon the resistor 127 is negative on the left hand terminal and positive on the right hand terminal for one particular half cycle and assuming that the ram temperature indicator 130 is effective to move the slider 129 toward the left upon a rise in the intake temperature or ram temperature of the engine, it will be seen that a voltage will appear between the slider 129 and the grounded center tap of the secondary of transformer 126. This voltage will be slightly negative with respect to ground and will be fed through the conductor 213 and summing resistor 131 to the input terminal 120 of amplifier 121. This negative signal will be such as to cause the motor 33 to rotate in a direction to effect movement of the eyelids 19 and 20 in an opening direction. Thus, it will be seen, that upon an increase in the intake temperature to the engine there wil be a resultant increase in the exhaust area of the engine. This ram temperature signal then has the effect of compensating the operation of the temperature control channel upon the operation of the eyelids 19 and 20 and will tend to stabilize the operation and prevent undue changes in the eyelids 19 and 20 when there are changes in the intake temperature.

Inasmuch as both the fuel control motor 32 and the eyelid control motor 33 are operating at the same time there is cross relation between the two control channels. Thus, when the motor 32 causes an increase in the fuel flow, there will be an increase in the engine temperature and this increase in temperature will cause the motor 33 to tend to open eyelids 19 and 20. However, the opening will be slight as the time constant of the fuel control channel is designed to be much faster than the time constant of the eyelids positioning channel so that the condition causing an increase in fuel flow can be corrected before there is an appreciable change in the position of the eyelids. If there should be a decrease in temperature the motor 33 will cause the eyelids 19 and 20 to close and there will be a resultant decrease in pressure drop across the turbine 11 so that it will tend to decrease the engine speed. This decrease in speed will tend to cause the motor 32 to increase fuel flow and, of course, the engine temperature. Thus, it will be seen there is a cross relation between the two control channels which results from the interaction of the engine speed and temperature functions within the engine proper. However, since the time constant of the eyelid control channel is longer than the fuel flow control channel, there will be no instability in the control of the engine.

Since engine speed and temperature are the primary functions which will determine the speed at which the gases leave the engine 10 and therefore the power or thrust from the engine, there must be coordination between the two functions so that power may be varied from a minimum to a maximum. Such is the function of the single power lever 30 which selects the engine speed and temperature according to predetermined schedules determined by the particular engine which the apparatus is controlling.

*Transient operation*

Under the conditions assumed thus far the apparatus has been under steady state or normal operation. The determining of whether or not a steady state or transient condition exists is by comparison of the selected engine speed and the actual engine speed. If the selected engine speed is greater than the actual enginee speed by more than a predetermined amount then it is desirable to change the control apparatus over into a different mode of operation so as to bring the engine speed up to the desired value as soon as possible. This changing over is accomplished by the transfer motor 108 which is arranged to be reversibly driven by amplifier 46. The control signals for the amplifier 46 arise from the speed selecting network 40, the biasing source 48 and from the speed indicating network 51. The signal from the speed selecting network is fed from the slider 43 of the network through a summing resistor 45 to the input of the amplifier 46 while the signals from the speed indicating network 51 appear upon the slider 55 and are fed through conductor 200 and summing resistor 60 to the input of amplifier 46. Under normal or steady state conditions the signals from these networks are not sufficient to affect the amplifier and the biasing source 48 will have an output of a phase which will cause the amplifier to maintain the motor 108 and slider in fixed end position.

Assuming the phasing on the networks to be the same as under the steady state conditions for one particular half cycle, and assuming that the power lever 30 has suddenly been moved to the left to an increased power position, it will be seen that the slider 43 will be moved to the left and there will be a positive signal appearing upon the slider 43 when measured with respect to the grounded center tap of the secondary of transformer 41. If at the instant that the power lever 30 is moved the speed indicating network 51 is balanced so that the slider 55 is centrally positioned on the resistor 53 and there is no signal appearing upon the slider 55 then the only signal on the input of amplifier 46 will be that arising from the network 40. This positive signal will be effective to cause the motor 108 to operate and to move the slider 106 of the transfer potentiometer 105 across the resistor 104 toward the right until it engages the summing terminal 185 or the right hand terminal of the resistor 104. When the slider is moved to this position the voltages from the speed control channel which appear at the summing terminal 50 will be effectively isolated from the amplifier 110 because of the resistance of resistor 104. Substituted for the control signals from the speed control channel will be the control signals from the temperature indicating channel, these signals appearing at the summing terminal 185. Thus, the electrical signals arising from the temperature indicating network 187 will be applied through the summing resistor 192 to the summing terminal 185 and the electrical signals arising from the maximum transient temperature calibration network 135 will be fed from the slider of potentiometer 140 through the summing resistor 186 to the summing terminal 185. With the slider 106 at the right end of resistor 104, the electrical signals appearing at the terminal 185 will be fed through the conductor 203 into the input of amplifier 110 so that now the amplifier will be sensing only the signals arising from the temperature indicating channel and will be controlling the operation of the motor 32 accordingly. It will be noted that this shift will be a gradual one with the signals on terminal 50 being faded out and those on 185 being brought in.

In considering more specifically the effect of the temperature control channel on the motor 32, first assume that the slider of potentiometer 140 is displaced left of the center of the potentiometer resistor so that there will be a signal voltage appearing on the slider when measured with respect to the grounded tap 138. Assuming the phasing of the secondary of the transformer 137 to be, for one particular half cycle, plus on the left hand terminal and negative on the right hand terminal, this will mean that with the slider displaced toward the left there will be a positive voltage appearing upon the slider and this positive voltage will be fed through the summing resistor 186, summing terminal 185, slider 106, and conductor 203 to the input of amplifier 110. Assume also that the slider 191 of the temperature indicating network 187 is centered upon the resistor 189 so that there is no electrical signal appearing upon the slider 191 when measured with respect of the grounded center tap of the secondary transformer 188. This will mean there is no electrical signal fed through the summing resistor to the terminal 185 and thus the only signal on the input amplifier 110 will be that arising from the calibration network 135. This control signal from the network 135 will be effective to cause the amplifier 110 to drive the motor 32 in a fuel increasing direction. With the increased amount of fuel flowing into the combustion chambers there will be an increase in the temperature therein and this temperature change will be sensed by the thermocouple 171.

When the thermocouple 171 begins to change temperature the motor 170 will start moving the slider 191 of the temperature indicating network 187 toward the right so that there will appear upon the slider 191 a signal which will be slightly negative when measured with respect to the grounded center tap of the secondary of the transformer 188. The movement of the slider 191 will not be effective to eliminate the positive signal arising from the calibration network 135 until such time as the maximum temperature has been reached. This maximum temperature is one which cannot be continued without injury to the engine. Obviously, as soon as the electrical signal arising from the temperature indicating network 187 is equal in magnitude and opposite in phase to the signal arising from the calibration network 135 there will be no signal applied to the input of amplifier 110 and the motor 32 will no longer be effective to cause an increase in the fuel flowing to the combustion chambers.

In order to further decrease the acceleration time it is desired that the eyelids 19 and 20, upon the occurrence of a transient condition, be opened to the wide open position. This opening movement is accomplished by applying a predetermined control signal into the amplifier 121. This signal is derived from the secondary winding 137 of the transformer 136 and from the operation of the camming mechanism 143 on the switch blade 141 and contact 142. The camming mechanism 143 is arranged to be driven by the motor 108 so that as soon as the motor 108 starts to drive the slider 106 across the resistor 104, on the transfer potentiometer 105, the motor will also be effective to drive the camming mechanism 143 through a slipping clutch arrangement so that the mechanism will rotate in a clock-wise direction.

As soon as the cam rise portion 145 moves out from under the switch blade 141 the blade will move out of engagement with contact 142 so that the left end of potentiometer resistor 147 is no longer grounded. The camming mechanism will move clockwise until such time as the stop 144B engages the stop 144. As soon as the switch blade 141 moves out of engagement with contact 142 the slider 148 of potentiometer 146 is efffectively connected to the right hand end of the secondary winding 137 and, with the above assumed phasing, the right hand end of the secondary 137 will be negative with respect to the grounded tap 138 so that there will be a negative signal appearing upon the slider 148 and this signal will be fed into the amplifier 121 through the summing resistor 149. As the motor 108 continues to operate to drive the slider 106 across the resistor 104 the motor will also be effective to move the slider 148 across the resistor 147 and, through suitable stop arrangements, not shown, the slider will be stopped when it reaches the right end of the resistor 147 even though the motor 108 may continue to operate. With the negative voltage applied to the input of amplifier 121 the amplifier will be effective to drive the motor and the motor in turn will cause the servo piston 38 to move the eyelids 19 and 20 to the wide open position.

As long as the selected engine speed is greater than the actual engine speed the motor 108 will be at a position in which it will maintain the slider 106 at the right end of the resistor 104 and the slider 148 at the right end of the resistor 147. As soon as the actual engine speed reaches the selected speed then the bias source 48 will cause the amplifier 46 to drive the motor 108 in the opposite direction. When the motor starts moving in the opposite direction the camming mechanism 143 will move counter clock-wise until the stop arm 144A engages the stop 144. When the mechanism has moved to this position the camming rise 145 will have moved the switch blade 141 into engagement with the contact 142 to effectively ground the left hand terminal of the potentiometer resistor 147. At the same time the slider 148 will start moving toward the left across the resistor 147 and the slider 106 will start moving to the left across resistor 104. As the slider 106 moves across the resistor 104 the controlling effect of the temperature control channel will be gradually decreasing and the control will be shifting back to the speed control of fuel flow.

The gradual and modulating transfer from the temperature control channel to the speed control channel will prevent sudden changes in the electrical signal applied to the input of amplifier 110 and thereby prevent any sudden operation of the bypass valve 34 which, of course, would affect the entire system by setting up oscillations in the flow of fuel and the operation of the eyelids. As the slider 148 moves toward the left across the resistor 147, the electrical signal arising from the right hand terminal of the secondary 137 will be decreasing gradually and the normal control effects of the temperature control channel will begin to become effective and the eyelids 19 and 20 will be gradually positioned back to the desired position which is controlled by the position of the power lever 30 and the actual engine temperature. This modulating adjustment also prevents any sudden surges in the operation of the eyelid from unduly affecting the rest of the operation of the engine. Obviously, if the eyelids 19 and 20 were suddenly moved toward the closed position in the same manner as they were at the start of the transient operation there would be a sudden change in the pressure drop across the turbine 11 and a change in the fuel flow as well as a change in the engine temperature. This modulating adjustment maintains the operation of the eyelids 19 nad 20 slow enough so that there is no appreciable effect upon the operation of the fuel system or the speed control channel.

As soon as the sliders 148 and 106 have moved back to their left hand positions upon their respective resistors 147 and 104 the apparatus will once again be in a steady state of normal operating condition. The apparatus will stay in this condition until such time as the engine speed becomes less than the selected speed by a predetermined amount.

It will also be noted that during the transient operation the only thing that is controlling the operation of amplifier 110 is the control signal arising from the temperature control channel, namely the temperature indicating network 187 and the temperature calibration network 135. Thus, all of the signals arising in the speed control channel which include the rate of change of engine temperature and the altitude signals are no longer effective upon the operation of the fuel control amplifier 110. The elimination of the altitude controlling function and the rate of change of temperature control function during the transient operation insures that the acceleration time will be maintained at a minimum and there will be nothing tending to cause the amplifier 110 to decrease the fuel flow before the desired operating point has been reached.

*Operation of surge control channel*

In considering the operation of the surge control channel, it should first be recognized that a compressor surge will occur when the engine speed, compressor intake temperature and turbine inlet temperature are of predetermined magnitude. The relationship between these functions is such that if engine speed and turbine inlet temperatures are constant, the tendency to have compressor surge will increase as the compressor intake temperature decreases. Also, with a constant engine speed and compressor intake temperature, the tendency to have compressor surge will increase with an increase in turbine intake temperature. Further, with a fixed compressor inlet temperature and turbine inlet temperature, the tendency to have compressor surge, when increasing speed from a low value to a high value, will first increase until a predetermined speed is reached and then decrease as the speed is further increased.

Recognizing these relationships, the surge control channel 225 has been provided. Under normal operating conditions, the calibration network has sufficient output signal thereon to cause amplifier 226 to maintain the motor 227 and the slider of potentiometer 113 at the right or grounded end thereof. As long as the slider remains in that position, there will be no signal from the network 111 fed into the fuel control amplifier 110.

Assuming the slider 234 of speed indicating network 230 to be centrally positioned on resistor 232, then there will be no effective signal from this network as it is grounded at the center tap thereof. Assuming further that slider 164 is centered on resistor 162 so that there is no signal on the inlet temperature indicating network. Then, with a decreasing inlet temperature to the compressor, the slider 129 will be moved toward the right. With the alternating current phasing assumed as above, there will be an output signal which will be positive on slider 129 with respect to ground and this positive signal will be fed into the input of amplifier 226. When of sufficient magnitude to overcome any calibration signal, this positive signal will cause the amplifier to drive the motor 227 to in turn move the slider of potentiometer 113 to the left. Assuming that the alternating current phasing of transformer 112 to be such that the right end of potentiometer 113 is positive with the left end negative, then movement of the slider to the left will result in a negative voltage appearing on the slider. This negative voltage will be fed through summing resistor 114 into the input of amplifier 110 where its effect will be to cause the amplifier to drive motor 32 in a fuel decreasing direction to limit the tendency to surge.

Assuming that the transformer 231 is phased so that during the half cycle of the power supply, under consideration, the resistor 232 is positive at the center and negative at either end, then movement of the slider 234, by the speed responsive device 56 from its above assumed center position, will result in the slider becoming negative with respect to ground, regardless of the direction which the slider is moved. When this more negative signal is applied to the input of amplifier 226, it will mean that the compressor intake temperature will have to decrease even further before the positive signal from network 125 will be effective to overcome this negative signal and cause the motor 227 to be driven to feed a fuel decreasing signal into the amplifier 110.

It will be obvious that the effect of the turbine inlet temperature will be the same as the compressor intake temperature. Thus, as the turbine inlet temperature increases, the slider 164 will be moved toward the right, and with the above assumed phasing, the slider will become positive with respect to ground. This positive signal, when fed through summing resistor 229 to amplifier 226 will combine with the signals from networks 230, 238, rebalance network 240 and network 125, and if the other signal outputs indicate with this positive signal from 160 that a surge condition is near, then the motor 227 will position potentiometer 113 to feed in a fuel reducing signal into amplifier 110. It will thus be seen that there has been provided a control for decreasing fuel flow to the controlled engine when there is an indication of conditions at the engine which may cause compressor surge.

*Conclusion*

From the foregoing it will be seen that there has been provided a power control for a combustion engine having a fuel flow controller which is normally under control of the engine speed and which is modulatingly shifted from the control by engine speed to control by engine temperature upon the occurrence of a condition requiring acceleration. It will also be seen there has been provided a means for increasing the outlet area of a combustion engine to a maximum upon the occurrence of a transient condition and modulating that exhaust opening back to a desired value upon the elimination of the transient condition. Further, the control apparatus protects against compressor surge. While many modifications of the apparatus will be obvious to those skilled in the art, it is intended the invention be limited solely by the scope of the appended claims.

I claim as my invention:

1. Apparatus for controlling a combustion engine having fuel flow control means and exhaust gas flow control means, the combination comprising, engine speed responsive means, engine speed selecting means, motor means connected to be controlled by said selecting means and said responsive means, connection means operably connecting said motor means in controlling relation to the fuel flow control means, engine temperature responsive means, a second motor means, second connection means operably connecting said second motor means in controlling relation to the exhaust gas flow control means, further means connecting said temperature control means in controlling relation to said second motor means, means responsive to a predetermined differential between selected speed and engine speed, a control signal source, and means including said last named responsive means and said control signal source connected to said second motor means to cause said motor means to be operated to a predetermined position.

2. Control apparatus for a combustion engine having fuel flow controlling means and gas flow control means, comprising in combination, engine speed selecting means, engine speed responsive means, a first motor means connected to control the fuel flow control means, means including said speed selecting means and said speed responsive means connected in controlling relation to said first motor means to control the fuel flow to maintain the engine speed at a selected value, a second motor means connection means operably connecting said second motor means in controlling relation to the gas flow control means, engine temperature responsive means, means including said temperature responsive means connected to control said second motor means in accordance with changes in engine temperature, electrical transfer means responsive to a predetermined differential between selected speed and engine speed, a control signal source, and means including said electrical transfer means connecting said control signal source to said second motor means to cause said motor means to move to a predetermined position independent of the engine temperature.

3. Control apparatus for a combustion engine having fuel flow control means and exhaust gas flow control means, the combination comprising, manually operated speed selecting means, engine speed responsive means, a first motor means connection means connecting said motor means in controlling relation to the fuel flow control means, means normally connecting said speed selecting means and said speed responsive means in controlling relation to said first motor means, engine temperature responsive means, engine temperature selecting means, a second motor means, second connection means connecting said second motor means in controlling relation to the exhaust gas flow control means to maintain a selected engine temperature, means connecting said temperature responsive means and said temperature selecting means in controlling relation to said second motor means, electrical transfer means, electrical control means responsive to a predetermined differential between selected speed and engine speed connected to actuate said transfer means, means including said transfer means connecting said temperature responsive means in control of said first motor means.

4. Combustion engine control apparatus for a variable speed engine having fuel flow control means and gas flow control means, the combination comprising, engine temperature responsive means, engine temperature selecting means, motor means, connection means connecting said motor means in controlling relation to the gas flow control means, means connecting said temperature selecting means and said temperature responsive means in controlling relation to said motor means, engine speed responsive means, engine speed selecting means, transfer controlling means, means including said speed selecting means and said speed responsive means connected to control said transfer controlling means and arranged to actuate said transfer means when a predetermined differential exists between engine speed and selected speed, a control signal source, means including said transfer control means connecting said control signal source to said motor means when said transfer means is actuated in a predetermined manner, said motor means when controlled by said control signal source causing said gas flow control means to be positioned in a predetermined manner.

5. Control apparatus for a combustion engine having fuel flow control means and gas flow control means, the combination comprising, engine speed selecting means, engine speed responsive means, a first motor means, connecting means connecting said motor means in controlling relation to the fuel flow control means, means connecting said speed responsive means and said speed selecting means in controlling relation to said first motor means to maintain the engine speed at a predetermined value, engine temperature responsive means, engine temperature selecting means, a second motor means, second connection means connecting said second motor means in controlling relation to the gas flow control means, means connecting said temperature responsive means and said temperature selecting means in controlling relation to said second motor means to maintain the engine temperature at a selected value, transfer control means, means connecting said speed selecting means and said speed responsive means in controlling relation to said transfer controlling means to actuate said control means in a predetermined manner when there is a predetermined difference between engine speed and selected speed, means controlled by said transfer control means for connecting said temperature control means in control of said first motor means, a fixed control signal source, means including said transfer control means for connecting said control signal source in controlling relation to said second motor means to cause said second motor means to position said gas flow control means to a predetermined position.

6. Control apparatus for a combustion engine having fuel flow control means and exhaust gas flow control means, the combination comprising, engine speed selecting means, engine speed responsive means, first motor means connected in controlling relation to the fuel flow control means, means connecting said speed selecting means and said speed responsive means in controlling relation to said first motor means so that said motor means will control the fuel flow to maintain the engine speed at a desired value, engine temperature selecting means, engine temperature responsive means, a second motor means, means connecting said temperature selecting means and said temperature responsive means in controlling relation to said second motor means, said second motor means arranged to control the exhaust gas flow control means to maintain a selected engine temperature, electrical control means connected to said speed selecting means and said speed responsive means, transfer control means, means including said electrical control means for actuating said transfer control means when there is a predetermined differential between selected engine speed and actual engine speed, said transfer control means having a modulating control effect, means including said transfer control means for gradually decreasing the controlling effect of said speed responsive means and said speed selective means on said first motor means and gradually increasing the controlling effect of said temperature responsive means on said first motor means, said transfer control means being effective when the selected speed and the actual engine speed fall within predetermined limits to decrease the controlling effect of said temperature responsive means upon said first motor means and increase the controlling effect of said speed selective and responsive means upon said first motor means.

7. Control apparatus for a combustion engine having fuel flow control means and gas flow control means, the combination comprising, engine speed selecting means, engine speed responsive means, transfer control means, means connecting said speed responsive means and said speed selecting means in controlling relation to said transfer means, first motor means, means including said transfer means connecting said speed selecting means and said speed responsive means in controlling relation to said first motor means when the engine speed is effectively the same as the selected speed, engine temperature responsive means, second motor means, engine temperature selecting means, electrical circuit means interconnecting said temperature responsive means and said temperature selecting means to reversibly control said second motor means, connection means connecting said second motor means in controlling relation to the gas flow control means, means including said transfer controlling means for decreasing the controlling effect of said speed selecting means and said speed responsive means when the engine speed differs from the selected speed by more than a predetermined amount, said transfer means when decreasing the controlling effect of said speed responsive and speed selecting means on said first motor means simultaneously acting to increase the controlling effect of said engine temperature responsive means on said first motor means.

8. Control apparatus for a combustion engine having fuel flow control means and gas flow control means, the combination comprising, speed selecting means, speed responsive means, transfer control means, a first motor means connected in fuel flow controlling relation to the fuel flow control means, means including said transfer means normally connecting said speed selecting means and said speed responsive means in controlling relation to said first motor means, engine temperature responsive means, engine temperature selecting means, a second motor means arranged in controlling relation to the gas flow control means, means connecting said temperature selecting means and said temperature responsive means in controlling relation to said second motor means, means including said transfer means gradually decreasing the controlling effect of the speed responsive means and the speed selecting means on said first motor means and transferring the controlling effect of said temperature responsive means to said first motor means, and means including switch means actuated by said transfer means for causing said second motor means to move to a predetermined position.

9. Control apparatus for a combustion engine having fuel flow control means and gas flow control means, the combination comprising, engine speed responsive means, engine speed selecting means, engine temperature responsive means, means responsive to the rate of change of engine temperature, a first motor means, connection means connecting said first motor means in controlling relation to the fuel flow control means, a second motor means arranged for controlling the gas flow control means, means connecting said speed selecting means, said speed responsive means, and said rate responsive means in controlling relation to said first motor means, means connecting said temperature responsive means in control of said second motor means, and transfer control means operative in response to a predetermined engine operating condition for connecting only said temperature responsive means in control of said first motor means.

10. Control apparatus for a combustion engine having fuel flow control means and exhaust gas flow control means, the combination comprising, a first motor means arranged for controlling the fuel flow control means, a second motor means connected for controlling the exhaust gas flow control means, speed control means normally connected in controlling relation to said first motor means, engine temperature responsive means normally connected in controlling relation to said second motor means, transfer control means having means responsive to a predetermined engine operating condition, means including said transfer control means connecting said temperature responsive means in control of said first motor means and disconnecting said speed control means from control of said first motor means upon the occurrence of said predetermined engine operating condition, and means including a switch means actuated by said transfer control means for causing said second motor means to move the exhaust gas flow control means to a predetermined position.

11. Control apparatus for a combustion engine having fuel flow control means and gas flow control means, the combination comprising, engine speed control means, engine temperature control means, a first motor means connected for controlling the fuel flow control means, a second motor means arranged to control the gas flow control means, means normally connecting said speed control means in controlling relation to said first motor means, means connecting said temperature control means in control of said second motor means, transfer control means, means including said transfer control means, upon the occurrence of a predetermined engine operating condition, gradually decreasing the effect of said speed control means upon said first motor means and connecting said temperature control means in control of said first motor means, said transfer control means upon said predetermined condition no longer existing decreasing the effect of said temperature control means on said first motor means and connecting said speed control means to said first motor means.

12. Apparatus for controlling a combustion engine having fuel flow control means and exhaust flow control means, the combination comprising, first motor means connected for controlling the fuel flow control means, second motor means connected for controlling the exhaust flow control means, speed control means connected in controlling relation to said first motor means to maintain the engine speed at a desired value, temperature control means connected in controlling relation to said second motor means, differential speed responsive means, transfer control means connected to be controlled by said differential speed responsive means, said transfer control means having a modulated control effect, means including said transfer control means when actuated by said differential speed responsive means gradually decreasing the controlling effect of said speed control means on said first motor means and gradually increasing the effect of said temperature control means on said first motor means, and means including said transfer control means for causing said second motor means to position the exhaust flow control means to predetermined fixed condition which is independent of engine temperature.

13. Control apparatus for a combustion engine having fuel flow control means and exhaust gas flow control means, the combination comprising, a first motor means connected in driving relation to the fuel flow control means, a second motor means connected in driving relation to the exhaust gas flow control means, engine temperature responsive means, means responsive to the rate of change of engine temperature, means connecting said rate responsive means in controlling relation to said first motor means, means connecting said temperature responsive means in control of said second motor means, transfer control means responsive to a predetermined deviation between selected and actual engine speeds, and means including said transfer control means for connecting said temperature responsive means in control of said first motor means independently of said rate responsive means when said predetermined engine speed deviation exits.

14. Control apparatus for a combustion engine which has fuel flow control means and gas flow control means, the combination comprising, engine temperature responsive means, means responsive to the rate of change of engine temperature, first motor means connected in controlling relation to the fuel flow control means, second motor means arranged to be connected to the gas flow control means, means connecting said temperature responsive means in controlling relation to said second motor means, means connecting said rate responsive means in controlling relation to said first motor means, condition responsive means responsive to a predetermined engine operating condition, transfer control means, means connecting said condition responsive means in control of said transfer control means to actuate said control means upon the occurrence of said predetermined engine operating condition, means including said transfer control means effectively disconnecting said rate responisve means from controlling relation of said first motor means and connecting said temperature responsive means in controlling relation to said first motor means, switch means controlled by said transfer control means, and means including said switch means connected to control said second motor means to cause said motor means to move to a predetermined position.

15. Control apparatus for a combustion engine of a sort adapted to be operated at varying altitudes having fuel flow control means and gas flow control means, the combination comprising, first motor means arranged for controlling the fuel flow control means, a second motor means arranged for controlling the gas flow control means, altitude responsive means, temperature responsive means, means connecting said altitude responsive means in controlling relation to said first motor means, means connecting said temperature responsive means in controlling relation to said second motor means, means responsive to a deviation between selected and actual engine speeds, means including said last named means for disconnecting said altitude responsive means from control of said first motor means and connecting said temperature responsive means in control of said first motor means.

16. Apparatus for controlling a combustion engine of a sort adapted to be operated at varying altitudes having fuel flow control means and gas flow control means, the combination comprising, first motor means for reversibly controlling the fuel flow control means, second motor means for reversibly controlling the gas flow control means, altitude responsive means, engine temperature responsive means, transfer switch means normally connecting said altitude responsive means in control of said first motor means, means connecting said temperature responsive means in controlling relation to said second motor means, means including said transfer switch means arranged for disconnecting said altitude responsive means from control of said first motor means and connecting said temperature responsive means in control of said first motor means, and switch means actuated by said transfer switch means connecting a fixed signal source in controlling relation to said second motor means to cause said motor means to position the gas flow control means in a predetermined position.

17. Control apparatus for a combustion engine having fuel flow control means and gas flow control means, the combination comprising, a first motor means connected in controlling relation to the fuel flow control means, speed selecting means, engine speed responsive means, follow up means responsive to the positioning of the fuel flow control means, means connecting said speed selecting means, said speed responsive means and said follow up means in controlling relation to said first motor means to maintain proportional control of the fuel flow to maintain a selected engine speed, a second motor means arranged for controlling the gas flow control means, engine temperature responsive means, means connecting said temperature responsive means in controlling relation to said second motor means, a second follow up means responsive to the positioning of the gas flow control means, means connecting said follow up control means in controlling relation to said second motor means to maintain proportional temperature control of the engine, engine speed sensitive transfer switch means, means including said transfer switch means disconnecting the speed selecting means, said responsive means, and said first follow up means from control of said first motor means and connecting said temperature responsive means in controlling relation to said first motor means, and further means actuated by said transfer control means for connecting a fixed signal source in control of said second motor means to cause said motor means to assume a predetermined position.

18. Control apparatus for a combustion engine having fuel flow control means and gas flow control means, the combination comprising, first motor means connected for controlling the fuel flow control means, speed control means connected in controlling relation to said first motor means, second motor means connected in controlling relation to the gas flow control means, engine temperature responsive means, means connecting said temperature responsive means in controlling relation to said second motor means, engine intake temperature responsive means, means connecting said intake temperature responsive means to said second motor means, and transfer switch means for connecting only said temperature responsive means to said first motor means and disconnecting said speed control means from said first motor means.

19. Apparatus for controlling a combustion engine having gas flow control means, the combination comprising, engine temperature responsive means, motor means connected in driving relation to the gas flow control means, means connecting said temperature responsive means in controlling relation to said motor means, engine speed responsive means, second motor means controlled by said speed responsive means, means including said second motor means and said speed responsive means connected to override the controlling effect of said temperature responsive means upon the occurrence of a predetermined deviation between actual and desired engine speed, said speed responsive means connecting said first named motor means to be controlled by a signal source independent of said temperature responsive means, and means including said second motor means reconnecting said temperature responsive means in controlling relation to said first named motor means in a modulating manner.

20. Control apparatus for a combustion engine having gas flow control means, comprising in combination, motor means connected in controlling relation to the gas flow control means, engine temperature responsive means, means connecting said temperature responsive means in controlling relation to said motor means, an electrical signal source, transfer means responsive to a predetermined engine operating condition, means connecting said signal source in controlling relation to said motor means upon said transfer means becoming operative, and means including said transfer means for modulatingly decreasing the controlling effect of said signal source upon said motor means upon said transfer means becoming inoperative.

21. Control apparatus for a combustion engine having gas flow control means, the combination comprising, a motor means connected in controlling relation to the gas flow control means, first engine condition responsive means arranged to modulatingly control said motor means, said first condition responsive means being capable of an output indicative of a need for operation of said motor means, a second engine condition responsive means, said second condition responsive means being capable of an output indicative of a need for operation of said motor means, means including said second condition responsive means when operative for overriding the controlling effects of the first condition responsive means and causing the gas flow control means to go to a predetermined position, and means including said second condition responsive means when becoming inoperative for decreasing the controlling effect of said second condition responsive means and reconnecting said first condition responsive means in controlling relation to said motor means in a modulating manner.

22. Control apparatus, comprising in combination, first motor means, first device to be controlled, means connecting said first motor means to said first device, second motor means, second device to be controlled, means connecting said second motor means to said second device, a first condition responsive controller being capable of an output indicative of a need for operation of said first device, a second condition responsive controller being capable of an output indicative of a need for operation of said second device, means connecting said first condition responsive controller in controlling relation to said first motor means, means connecting said second condition responsive controller in controlling relation to said second motor means, third condition responsive means, means including said third condition responsive means for modulatingly decreasing the controlling effect of said first condition responsive controller upon said first motor means and connecting said second condition responsive controller in controlling relation to said first motor means.

23. Motor control apparatus, comprising in combination, first motor means, first device to be controlled, means connecting said first motor means to said first device, second motor means, second device to be controlled, means connecting said second motor means to said second device, first condition responsive means responsive to a condition indicative of a need for operation of said first motor means, second condition responsive means responsive to a condition indicative of a need for operation of said second motor means, means connecting said first condition responsive means in controlling relation to said first motor means, means connecting said second condition responsive means in controlling relation to said second motor means, third condition responsive means, a fixed signal source, means including said third condition responsive means for decreasing the controlling effect of said first condition responsive means upon said first motor means and connecting said second condition responsive means in controlling relation to said first motor means, and means including said third condition responsive means for connecting said second motor means in controlled relation to said signal source.

24. Motor control apparatus, comprising in combination, first motor means, first device to be controlled, connection means connecting said first motor means to said first device, second motor means, second device to be controlled, second connection means connecting said second motor means to said second device, first condition responsive means responsive to a condition indicative of a need for operation of said first motor means, second condition responsive means responsive to a condition indicative of a need for operation of said second motor means, means connecting said first condition responsive means in controlling relation to said first motor means, means connecting said second condition responsive means in controlling relation to said second motor means, third condition responsive means having inoperative and operative positions, a signal source, means including said third condition responsive means when moving from the inoperative to the operative position for gradually decreasing the controlling effect of said first condition responsive means upon said first motor means and connecting said second condition responsive means in controlling relation to said second motor means, and further means controlled by said third condition responsive means when moving from the inoperative position to the operative position for connecting said signal source in controlling relation to said second motor means, and means including said third condition responsive means when moving from the operative position to the inoperative position for gradually decreasing the controlling effect of said signal source upon said second motor means and gradually shifting the controlling effect of said second condition responsive means upon said first motor means back to said first condition responsive means.

25. Control apparatus for a combustion engine having a compressor, gas flow control means, and fuel flow control means, the combination comprising, engine speed control means, first motor means, means connecting said motor means in controlling relation to the fuel flow control means, means connecting the speed control means in controlling relation to said first motor means, second motor means, means connecting said second motor means in controlling relation to the gas flow control means, engine temperature responsive means, means connecting said temperature responsive means in controlling relation to said second motor means, transfer control means, means including said transfer control means when operative for connecting said temperature responsive means in controlling relation to said first motor means and rendering said temperature responsive means ineffective to control said second motor means, a controller effective to respond to engine operating conditions affecting compressor surge, said controller comprising means responsive to the summation of signals indicative of intake air temperature of the compressor, engine speed, and engine temperature, and means continuously connecting said controller in controlling relation to said first motor means.

26. Engine control apparatus having fuel flow control means and gas flow control means, said control means being effective to cause variation in the air flow to the engine, the combination comprising, first motor means connected for controlling the fuel flow control means, second motor means connected for controlling the air flow control means, first condition responsive means responsive to a condition indicative of a need for operation of said first motor means, second condition responsive means responsive to a condition indicative of a need for operation of said second motor means, means connecting said first condition responsive means in controlling relation to said first motor means, means connecting said second condition responsive means in controlling relation to said second motor means, third condition responsive means, and means including said third condition means for decreasing the controlling effects of said first condition responsive means upon said first motor means and connecting said second condition responsive means in controlling relation to said first motor means.

References Cited in the file of this patent

UNITED STATES PATENTS

| 1,312,899 | Peltene | Aug. 12, 1919 |
| 2,411,895 | Poole | Dec. 3, 1946 |
| 2,434,189 | Ziebolz | Jan. 6, 1948 |
| 2,442,049 | Lee | May 25, 1948 |
| 2,474,018 | Sparrow | June 21, 1949 |
| 2,482,254 | Fairchild | Sept. 20, 1949 |
| 2,485,431 | Chudyk | Oct. 18, 1949 |
| 2,510,753 | Multhaup | June 6, 1950 |
| 2,514,248 | Lombard | July 4, 1950 |
| 2,514,513 | Price | July 11, 1950 |
| 2,520,434 | Robson | Aug. 29, 1950 |
| 2,540,916 | Sparrow | Feb. 6, 1951 |
| 2,545,703 | Orr | Mar. 20, 1951 |
| 2,558,592 | Starkey et al. | June 26, 1951 |
| 2,581,275 | Mock | Jan. 1, 1952 |
| 2,606,420 | Moore | Aug. 12, 1952 |
| 2,648,194 | Jorgensen | Aug. 11, 1953 |
| 2,650,471 | Kundsen | Sept. 1, 1953 |
| 2,697,908 | Offner | Dec. 28, 1954 |

FOREIGN PATENTS

| 254,367 | Switzerland | Dec. 16, 1948 |